Dec. 26, 1939.  N. A. HENDRIX  2,184,812
SAFETY HOOK
Filed Feb. 23, 1939
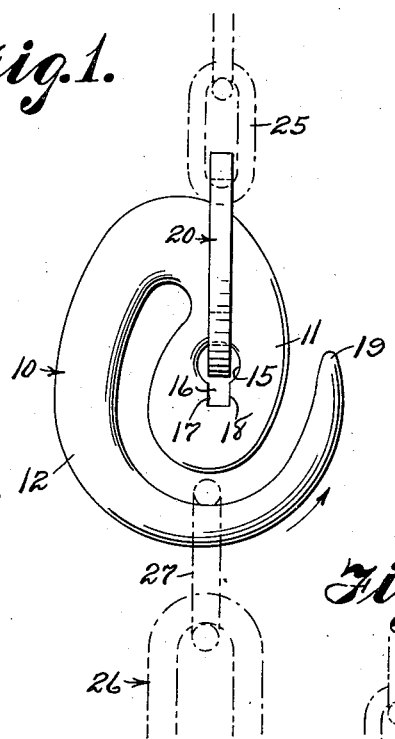
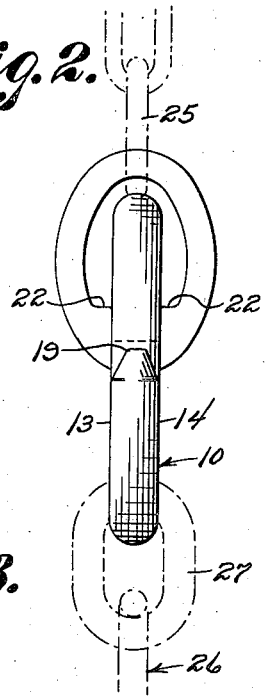
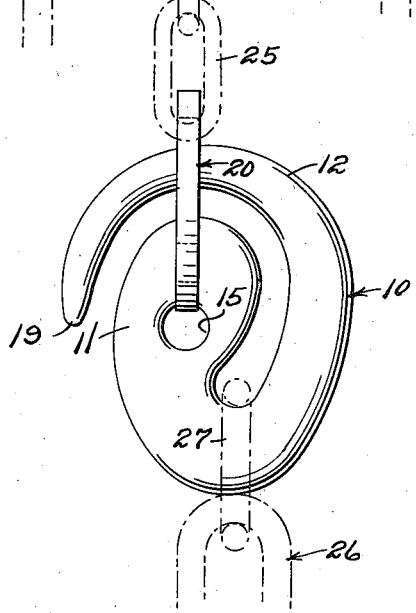
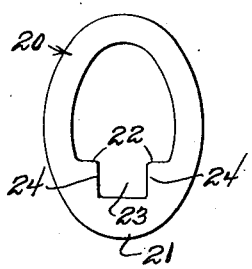
Nathan A. Hendrix INVENTOR
BY Victor J. Evans & Co.
ATTORNEYS Patented Dec. 26, 1939

2,184,812

UNITED STATES PATENT OFFICE 2,184,812

SAFETY HOOK

Nathan A. Hendrix, Reno, Nev.

Application February 23, 1939, Serial No. 258,030

4 Claims. (Cl. 24—230.5)

My invention relates to improvements in safety hooks.

An important object of my invention is the provision of a safety hook that may be easily connected to the link of a chain, and that will hold the same securely engaged therewith.

Another object of my invention is the provision of a safety hook that is interlocking in its engagement with a chain in a manner whereby the chain will not be inadvertently released.

Yet another object of my invention is the provision of a safety hook that is simple in construction, efficient in operation, and inexpensive to manufacture.

Other objects and advantages of my invention will be apparent during the course of the following description.

In the drawing, forming a part of this specification, and in which like numerals are employed to designate like parts throughout the same, Figure 1 is a plan view of a device embodying my invention, and showing the initial position of the parts when a chain is being coupled thereto, Figure 2 is an end elevation thereof, Figure 3 is a plan view of the device, and showing the parts in the locked position, and Figure 4 is a plan view of the locking ring, embodying a part of my invention.

In the accompanying drawing, wherein for the purpose of illustration, is shown a preferred embodiment of my invention, the numeral 10 designates the body of the hook which includes an elongated head portion 11 and a tapered tail 12 integrally connected to and spaced spirally around the head portion 11. The sides 13 and 14 of the hook are flat and the edges thereof are rounded to facilitate the insertion of the link of a chain thereon. A substantially keyhole shaped opening 15 is provided at substantially the middle of the elongated head portion 11, and the constricted portion 16 of the opening is formed with vertical, spaced side walls 17 and 18. The tail portion 12 of the hook tapers at its extremity to a blunt point 19 and substantially encircles the head to terminate at a point substantially laterally of the opening 15.

A locking ring 20 is linked through the opening 15, and the end 21 thereof has its inner periphery formed with inwardly extending abutments 22 to form the recess 23. The recess 23 has vertically spaced side walls 24 commensurate with the thickness of the hook 10. The link 20 is of sufficient length to permit the hook to be rotated therethrough, and with the keyhole shaped opening as the center of rotation.

A chain 25, illustrated in dotted lines in the drawing, is permanently attached to the locking ring 20. When it is desired to couple the chain 26 to the chain 25, the end link 27 of the chain 26 is inserted over the end 19 of the hook 10. This operation is effected with the locking ring and hook in the position as illustrated in Figure 1. From this position the hook is rotated through substantially 180°, in the direction as indicated by the arrow in Figure 1, so that the end 19 of the hook will pass through the locking ring, and the constricted portion 16 of the opening 15 will interlock with the recess 23 in the locking ring. The vertical side walls 17 and 18 of the opening 15 are substantially the same distance apart as the thickness of the ring 20 and will press against the sides thereof, when the hook is in the position as illustrated in Figure 3. Similarly, the vertical walls 24 of the recess 23 will contact the sides of the hook, and an interlocking engagement therebetween will be effected to prevent further rotation of the hook, and the possible accompanying consequence of the inadvertent releasing of the chain 26 therefrom.

It may thus be seen that the placing of the auxiliary chain 26 on the hook may be accomplished easily and expeditiously, and that by rotating the hook 180° with respect to the locking ring 20, an interlocking engagement will be effected therewith, and the link 27 of the chain 26 will be positioned at the inner extremity of the interstice between the tail portions 12 and head portion 11 of the hook 10.

It is to be understood that the form of my invention, herewith shown and described, is to be taken as a preferred example of the same, and that various changes in the size, shape and arrangement of parts may be resorted to without departing from the spirit of my invention or the scope of the appended claims.

Having thus described my invention, I claim:

1. A safety hook comprising a head portion having a substantially keyhole-shaped opening therein and an integrally formed tail portion wound spirally therearound, and a locking ring having an inner recess at one end adapted to interlock with the constricted portion of the keyhole-shaped opening to retain the link of a chain in the interstice between the said head and tail portion.

2. A safety hook comprising a head portion having a substantially keyhole-shaped opening therein and an integrally formed tail portion wound spirally therearound, and a locking ring adapted to receive the tail portion therethrough and having an inner recess at one end adapted to interlock with the constricted portion of the keyhole-shaped opening to retain the link of a chain in the interstice between the said head and tail portion.

3. A safety hook comprising a body having a head with a keyhole-shaped opening therethrough and a tail portion formed integrally therewith and spaced spirally therearound, and a locking ring pivotally received in the said keyhole-shaped opening and having a recess adapted to interlock with the constricted portion of the keyhole-shaped opening.

4. A safety hook comprising a body having a head with a keyhole-shaped opening therethrough and a tail portion formed integrally therewith and spaced spirally therearound, and a locking ring pivotally received in the keyhole-shaped opening and having a recess adapted to interlock with the constricted portion of the keyhole-shaped opening, whereby the link of a chain may be received by the tail portion and the body pivoted through the locking ring to the locking position in a manner whereby the said link will be positioned at the point of junction of the said head and tail portions, and with the end of the said tail portion extending through the said locking ring.

NATHAN A. HENDRIX.